United States Patent
Fukuda et al.

(10) Patent No.: US 8,203,614 B2
(45) Date of Patent: Jun. 19, 2012

(54) IMAGE PROCESSING APPARATUS, IMAGE PROCESSING METHOD, AND IMAGE PROCESSING PROGRAM TO DETECT MOTION ON IMAGES

(75) Inventors: Mitsuaki Fukuda, Kawasaki (JP); Soichi Hama, Kawasaki (JP); Takahiro Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 384 days.

(21) Appl. No.: 12/566,054

(22) Filed: Sep. 24, 2009

(65) Prior Publication Data
US 2010/0013938 A1    Jan. 21, 2010

Related U.S. Application Data

(63) Continuation of application No. PCT/JP2007/056683, filed on Mar. 28, 2007.

(51) Int. Cl.
*H04N 5/228* (2006.01)

(52) U.S. Cl. ..................... 348/208.4; 382/107

(58) Field of Classification Search .................. 348/362, 348/208.99, 208.1–208.16, 222.1; 382/107, 382/199, 266
See application file for complete search history.

(56) References Cited

U.S. PATENT DOCUMENTS

| | | |
|---|---|---|
| 5,604,820 A | 2/1997 | Ono |
| 5,604,823 A | 2/1997 | Ono |
| 5,619,593 A | 4/1997 | Ono |
| 5,729,290 A * | 3/1998 | Tokumitsu et al. ........... 348/349 |
| 5,740,274 A | 4/1998 | Ono et al. |
| 5,751,831 A | 5/1998 | Ono |
| 5,878,165 A | 3/1999 | Ono |
| 6,035,067 A * | 3/2000 | Ponticos ....................... 382/226 |
| 6,144,366 A | 11/2000 | Numazaki et al. |
| 6,961,447 B2 | 11/2005 | Onuma et al. |
| 7,477,289 B2 * | 1/2009 | Kondo et al. ............... 348/208.4 |
| 7,583,292 B2 * | 9/2009 | Kondo et al. ............... 348/208.4 |

(Continued)

FOREIGN PATENT DOCUMENTS
JP          64-65486 A          3/1989

(Continued)

OTHER PUBLICATIONS

International Preliminary Report on Patentability (Form PCT/IB/373) of International Application No. PCT/JP2007/056683 with Forms PCT/ISA/237, dated Oct. 20, 2009.

(Continued)

*Primary Examiner* — Nelson D. Hernández Hernández
(74) *Attorney, Agent, or Firm* — Westerman, Hattori, Daniels & Adrian, LLP

(57) ABSTRACT

An image processing apparatus includes a first image acquisition section that acquires a first image of an object at illumination-off time, a second image acquisition section that acquires a second image of the object at illumination-on time, a difference image generation section that generates a difference image based on a difference between luminance of each of pixels constituting the first image and luminance of each of pixels constituting the second image, a high-luminance area extraction section that extracts an image area constituted by pixels having a luminance value which is equal to or more than a predetermined luminance value from the difference image, and a movement determination section that determines a movement amount of the object between image take timing of the first image and image take timing of the second image based on the image area.

20 Claims, 21 Drawing Sheets

U.S. PATENT DOCUMENTS

| | | | |
|---|---|---|---|
| 2002/0051058 A1* | 5/2002 | Ito et al. | 348/152 |
| 2004/0145673 A1* | 7/2004 | Washisu | 348/364 |
| 2006/0078165 A1* | 4/2006 | Watanabe | 382/107 |
| 2007/0146538 A1* | 6/2007 | Kakinuma et al. | 348/362 |
| 2008/0075362 A1* | 3/2008 | Nagano et al. | 382/155 |
| 2008/0170124 A1* | 7/2008 | Hatanaka et al. | 348/208.4 |
| 2008/0199051 A1* | 8/2008 | Seo | 382/107 |
| 2008/0253676 A1* | 10/2008 | Oh et al. | 382/255 |

FOREIGN PATENT DOCUMENTS

| | | |
|---|---|---|
| JP | 4-72984 A | 3/1992 |
| JP | 05-210739 A | 8/1993 |
| JP | 10-032824 A | 2/1998 |
| JP | 10-177449 A | 6/1998 |
| JP | 11-355779 A | 12/1999 |
| JP | 2001-025001 A | 1/2001 |
| JP | 2002-259985 A | 9/2002 |

OTHER PUBLICATIONS

International Search Report for PCT/JP2007/056683, mailing date of Jul. 17, 2007.

* cited by examiner

STATE WHERE INSIDE OF
OUTLINE IS BLACKED OUT

FIG.11

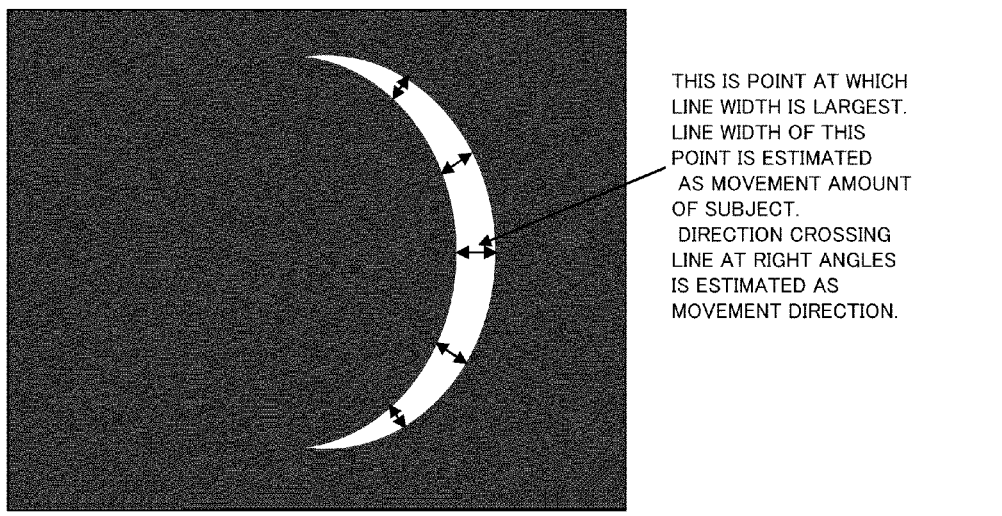

THIS IS POINT AT WHICH
LINE WIDTH IS LARGEST.
LINE WIDTH OF THIS
POINT IS ESTIMATED
AS MOVEMENT AMOUNT
OF SUBJECT.
DIRECTION CROSSING
LINE AT RIGHT ANGLES
IS ESTIMATED AS
MOVEMENT DIRECTION.

FIG.12

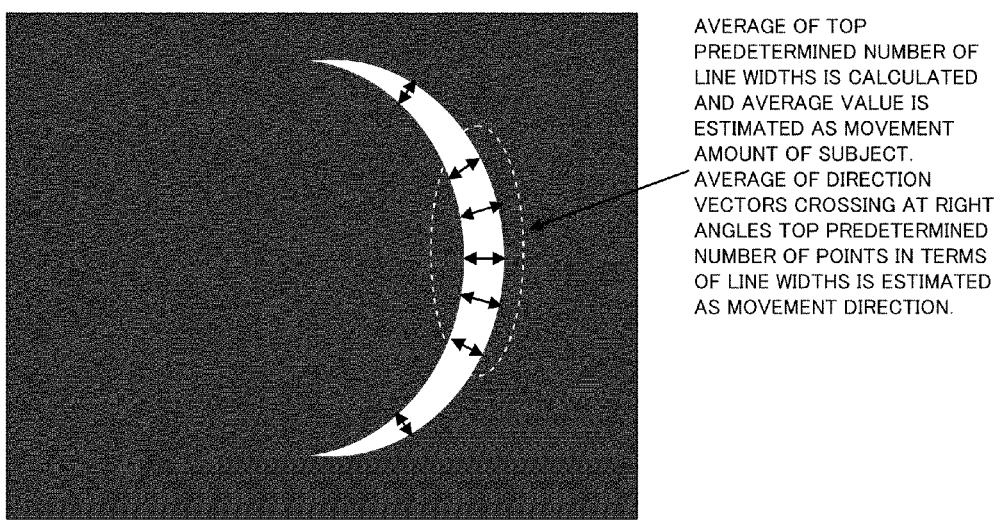

AVERAGE OF TOP
PREDETERMINED NUMBER OF
LINE WIDTHS IS CALCULATED
AND AVERAGE VALUE IS
ESTIMATED AS MOVEMENT
AMOUNT OF SUBJECT.
AVERAGE OF DIRECTION
VECTORS CROSSING AT RIGHT
ANGLES TOP PREDETERMINED
NUMBER OF POINTS IN TERMS
OF LINE WIDTHS IS ESTIMATED
AS MOVEMENT DIRECTION.

| 0 | 0 | 0 |
|---|---|---|
| x | p | x |
| 1 | 1 | 1 |

| 0 | 0 | x |
|---|---|---|
| 0 | p | 1 |
| x | 1 | 1 |

| 0 | x | 1 |
|---|---|---|
| 0 | p | 1 |
| 0 | x | 1 |

| 0 | 0 | 0 |
|---|---|---|
| x | p | x |
| 1 | 1 | 1 |

| x | 0 | 0 |
|---|---|---|
| 1 | p | 0 |
| 1 | 1 | x |

| 1 | x | 0 |
|---|---|---|
| 1 | p | 0 |
| 1 | x | 0 |

| 1 | 1 | 1 |
|---|---|---|
| x | p | x |
| 0 | 0 | 0 |

| 1 | 1 | x |
|---|---|---|
| 1 | p | 0 |
| x | 0 | 0 |

| 1 | x | 0 |
|---|---|---|
| 1 | p | 0 |
| 1 | x | 0 |

| 1 | 1 | 1 |
|---|---|---|
| x | p | x |
| 0 | 0 | 0 |

| x | 1 | 1 |
|---|---|---|
| 0 | p | 1 |
| 0 | 0 | x |

| 0 | x | 1 |
|---|---|---|
| 0 | p | 1 |
| 0 | x | 1 |

EXAMPLE OF MASK IMAGE THAT IS
EXPANDED IN MOVEMENT DIRECTION OF SUBJECT
BY AMOUNT CORRESPONDING TO MOVEMENT AMOUNT

# IMAGE PROCESSING APPARATUS, IMAGE PROCESSING METHOD, AND IMAGE PROCESSING PROGRAM TO DETECT MOTION ON IMAGES

CROSS-REFERENCE TO RELATED APPLICATIONS

This application is a continuation application, filed under 35 U.S.C. §111(a), of PCT Application No. PCT/JP2007/056683, filed Mar. 28, 2007, the disclosure of which is herein incorporated in its entirety by reference.

FIELD

The present invention relates to an image processing technique in which an object to be imaged on a taken image is extracted based on an image obtained by taking an image of the object to be imaged at the time of non-illumination at which the object to be imaged is not illuminated and an image obtained by taking an image of the object at the time of illumination at which the object to be imaged is illuminated.

BACKGROUND

In the case where an image of a subject is taken when the subject comes into view in fixed-point observation for the purpose of monitoring or authentication, there may arise a demand that only the subject is extracted with a background behind the subject removed.

As a technique for meeting the demand, there is known the following one. That is, in this technique, light emitted from an illumination unit for illuminating a subject coming into camera's view is made to blink, and image taking operation is performed in sync with the blinking of the illumination. Then, a difference in pixel values between an image taken at the light-on time and an image taken at the light-off time is calculated and, based on the calculation result, a background image behind the subject is removed to generate an image in which only the subject remains (hereinafter, referred to as "illumination on/off difference").

For example, there is known a technique in which an image obtained through the illumination on/off difference is used to acquire a subject image that is not affected by ambient light (refer to, e.g., Patent Document 1). However, in the process of generating such an image based on the illumination on/off difference, when a slight movement of the subject occurs in a short period time between the illumination-on time and illumination-off time, an image in which a subject is blurred is obtained, with the result that the subject may not appropriately be extracted.

Further, as a technique that uses the illumination on/off difference, there is known one that projects dot pattern illumination onto a subject when an abnormal object is detected by a comparison with a previously taken normal image (refer to, e.g., Patent Document 2). In this technique, the illumination on/off difference is used in order to clearly image the dot pattern. Although there are several examples that use the illumination on/off difference to check presence/absence of a subject as described above, these known techniques only check presence/absence of a subject but do not consider the blurring of an image caused due to a movement of the subject.

In addition, a technique is known in which images of a subject are continuously taken at an extremely short time interval so as to keep the movement amount of the subject between the taken images within one pixel to thereby prevent subject blurring. However, when the movement speed of the subject is higher than the image taking speed or when high-speed continuous image taking is difficult due to insufficient illumination, this technique may not prevent the subject blurring completely. In particular, when the subject is close to a camera, the subject blurring is likely to get worse.

In the filed of video encoding such as MPEG, there is known a motion detection technique that performs block matching processing for partial images to calculate the movement direction or movement amount of a moving object in the video. However, the block matching processing generally involves a large amount of calculation, so that dedicated hardware or a CPU capable of performing high-speed mathematical processing is required, resulting in an increase of cost.

Japanese Laid-open Patent Publication No. 10-177449
Japanese Laid-open Patent Publication No. 2001-25001

SUMMARY

According to an aspect of the present invention, there is provided an image processing apparatus including a first image acquisition section that acquires a first image obtained by taking an image of an object to be imaged at illumination-off time at which the object is not illuminated; a second image acquisition section that acquires a second image obtained by taking an image of the object at illumination-on time at which the object is illuminated; a difference image generation section that generates a difference image based on a difference between luminance of each of pixels constituting the first image acquired by the first image acquisition section and luminance of each of pixels constituting the second image acquired by the second image acquisition section; a high-luminance area extraction section that extracts an image area constituted by pixels having a luminance value which is equal to or more than a predetermined luminance value from the difference image generated by the difference image generation section; and a movement determination section that determines, based on the image area extracted by the high-luminance area extraction section, a movement amount of the object between image take timing of the first image and image take timing of the second image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a view for explaining a determination method of the movement amount and movement direction employed by a movement determination section 106.

FIG. 12 is a view for explaining a determination method of the movement amount and movement direction employed by a movement determination section 106.

DESCRIPTION OF EMBODIMENTS

Preferred embodiments of the present invention will be explained with reference to accompanying drawings.

(First Embodiment)

A first embodiment of the present invention will be described. In the present embodiment, if an object to be imaged is moved during image taking interval when a difference image is generated based on continuously taken two images, a phenomenon that a high-luminance pixel area appears on or inside the outline portion of the object to be imaged in the difference image is used.

Figure 1:
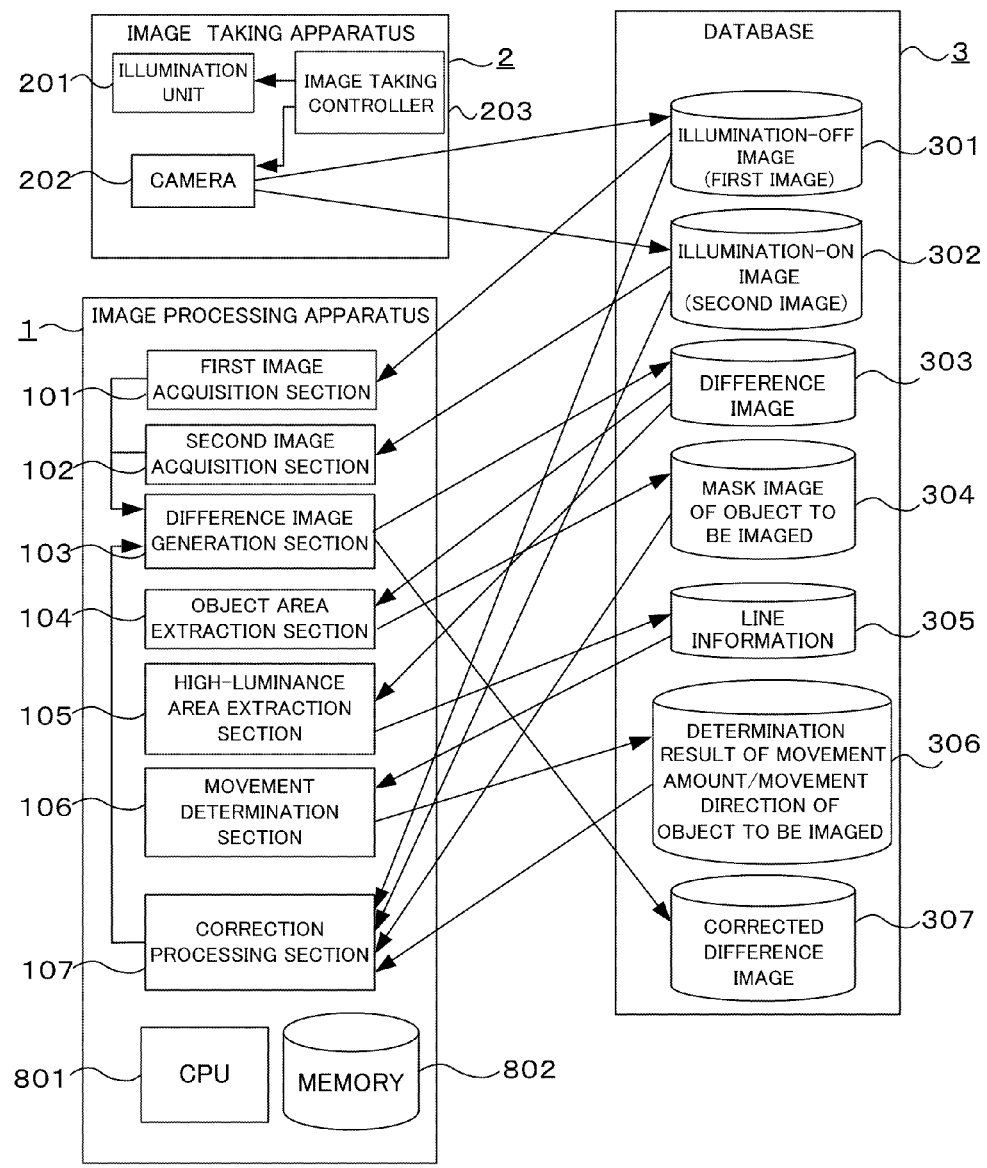
FIG. 1 is a functional block diagram for explaining a configuration of an image processing apparatus according to a first embodiment of the present invention.

FIG. 1 is a functional block diagram for explaining a configuration of an image processing apparatus according to the first embodiment of the present invention. An image processing apparatus 1 according to the present embodiment may acquire image data by taking an image of an object to be imaged with an image taking apparatus 2. The image data that has been acquired by the image taking apparatus 2 is stored in a database 3, and the image processing apparatus 1 refers to the database 3 so as to acquire the image data. The image processing apparatus 1, image taking apparatus 2, and database 3 are communicably connected to one another through an electric communication line. The electric communication line may be wired or wireless.

The image taking apparatus 2 includes an illumination unit 201 for illuminating an object to be imaged, a camera 202 such as a CCD camera for taking an image of an object to be imaged, and an image taking controller 203 for controlling the illumination unit 201 and camera 202. The illumination unit 201 may be turned on/off at a desired timing according to an instruction from the image taking controller 203. Hereinafter, in the present embodiment, a state where an object to be imaged is illuminated by the illumination unit 201 is referred to as "illumination time" and a state where an object to be imaged is not illuminated by the illumination unit 201 is referred to as "non-illumination time".

The database 3 is constituted by, e.g., a database server, and has a role of storing image data that has been acquired by the image taking apparatus 2 and managing various date used in the image processing apparatus 1. Although a case where various data used in the image processing apparatus 1 are stored in the database 3 (device outside the image processing apparatus 1) is illustrated as an example, they may be stored in a predetermined storage area provided in the image processing apparatus 1.

The image processing apparatus 1 according to the present embodiment includes a first image acquisition section 101, a second image acquisition section 102, a difference image generation section 103, an object area extraction section 104, a high-luminance area extraction section 105, a movement determination section 106, a correction processing section 107, a CPU 801, and a MEMORY 802.

The first image acquisition section 101 acquires, from the database 3, "illumination-off image (first image)" that is obtained by taking an image of an object to be imaged using the camera 202 at "non-illumination time".

The second image acquisition section 102 acquires, from the database 3, "illumination-on image (second image)" that is obtained by taking an image of an object to be imaged using the camera 202 at "illumination time". The acquisition of the image data by the first and second image acquisition sections need not be made through a storage area, but the image data that has been taken by the camera 202 may directly be loaded into the first and second image acquisition sections.

The difference image generation section 103 generates a "difference image" representing a difference in the luminance between each of pixels constituting the "illumination-off image" acquired by the first image acquisition section 101 and each of pixels constituting the "illumination-on image" acquired by the second image acquisition section 102. The difference image generated by the difference image generation section 103 is stored in a difference image storage area 303 provided in the database 3.

The object area extraction section 104 extracts a pixel area corresponding to the object to be imaged from the "illumination-off image" and "illumination-on image" based on the "difference image" generated by the difference image generation section 103.

The high-luminance area extraction section 105 extracts an image area constituted by pixels having a predetermined luminance value or more from the difference image generated by the difference image generation section 103.

The movement determination section 106 determines, based on the image area extracted by the high-luminance area extraction section 105, the movement amount of the object to be imaged between the image take timing of the "illumination-off image" and image take timing of the "illumination-on image". A determination result obtained in the movement determination section 106 is stored in an object movement amount/movement direction determination result storage area 306 provided in the database 3. In the present embodiment, the illumination-on image is taken first and then the illumination-off image is taken, so that the movement amount determined by the movement determination section 106 corresponds to the amount of movement occurring from the image take timing of the "illumination-on image" to image take timing of the "illumination-off image". The image take order of the illumination-off image and illumination-on image may be arbitrarily set as long as the image take timing thereof is not the same.

More specifically, the movement determination section 106 applies "thinning processing" (to be described later) to the image area extracted by the high-luminance area extraction section 105 so as to obtain a thin line. Then, the movement determination section 106 determines, as the movement amount, the largest dimension of the image area in the direction perpendicular to the obtained thin line. Further, the movement determination section 106 determines, as the movement direction of the object to be imaged, the direction perpendicular to the thin line obtained as a result of the thinning processing applied to the image area extracted by the high-luminance area extraction section 105 at the position at which the dimension of the image area in the direction perpendicular to the thin line is largest.

In addition, the movement determination section 106 may determine, as the movement amount, a value obtained by averaging values of the top three (top predetermined number of) dimensions of the image area in the direction perpendicular to the thin line obtained as a result of the thinning processing applied to the image area extracted by the high-luminance area extraction section 105. In addition, the movement determination section 106 may determine, as the movement direction of the object to be imaged, the average of the directions perpendicular to the thin line obtained as a result of the thinning processing applied to the image area extracted by the high-luminance area extraction section 105 at a plurality of positions at which the top predetermined number of dimensions of the image area in the direction perpendicular to the thin line is obtained.

In addition, in the case where a difference between each of dimensions of the image area in the direction perpendicular to the thin line obtained as a result of the thinning processing applied to the image area extracted by the high-luminance area extraction section 105 at a predetermined number of positions on the thin line falls below a predetermined dimension value, the movement determination section 106 may determine that the movement direction of the object to be imaged corresponds to the image take direction of the image taking apparatus that takes an image of the object to be imaged.

As described above, it is possible to determine the movement amount and movement direction of the object to be imaged in the movement determination section 106 through comparatively low load processing. The above movement amount detection involves lighter processing than other means such as repetition of block matching processing, so that it may be realized by inexpensive hardware.

The object area extraction section 104 extracts, from one of the illumination-off image and illumination-on image, an image area constituted by pixels having a pixel value exceeding a predetermined pixel value as an image area corresponding to the object to be imaged based on the difference image generated by the difference image generation section 103. Based on the extracted image area, it is possible to adequately grasp the movement amount and movement direction of the object to be imaged and thereby to easily realize extraction processing of the object to be imaged for correcting a displacement caused due to the movement.

The correction processing section 107 makes a correction, based on the movement amount determined by the movement amount determination section 106, such that the position and dimension of the pixel area corresponding to the object to be imaged extracted from one of the illumination-off image and illumination-on image by the object area extraction section 104 on the image become substantially the same as those of the pixel area corresponding to the object to be imaged in the other one of the illumination-off image and illumination-on image. The correction processing section 107 not only corrects the coordinate values on the image (linear movement) but also relatively rotates the images in the case where the object to be imaged has been rotated.

The CPU 801 has a role of performing various processing in the image processing apparatus. Further, the CPU 801 executes a program stored in the MEMORY 802 to realize various functions. The MEMORY 802 is constituted by, e.g., an ROM or RAM and has a role of storing various information and program used in the image processing apparatus.

Figure 2:
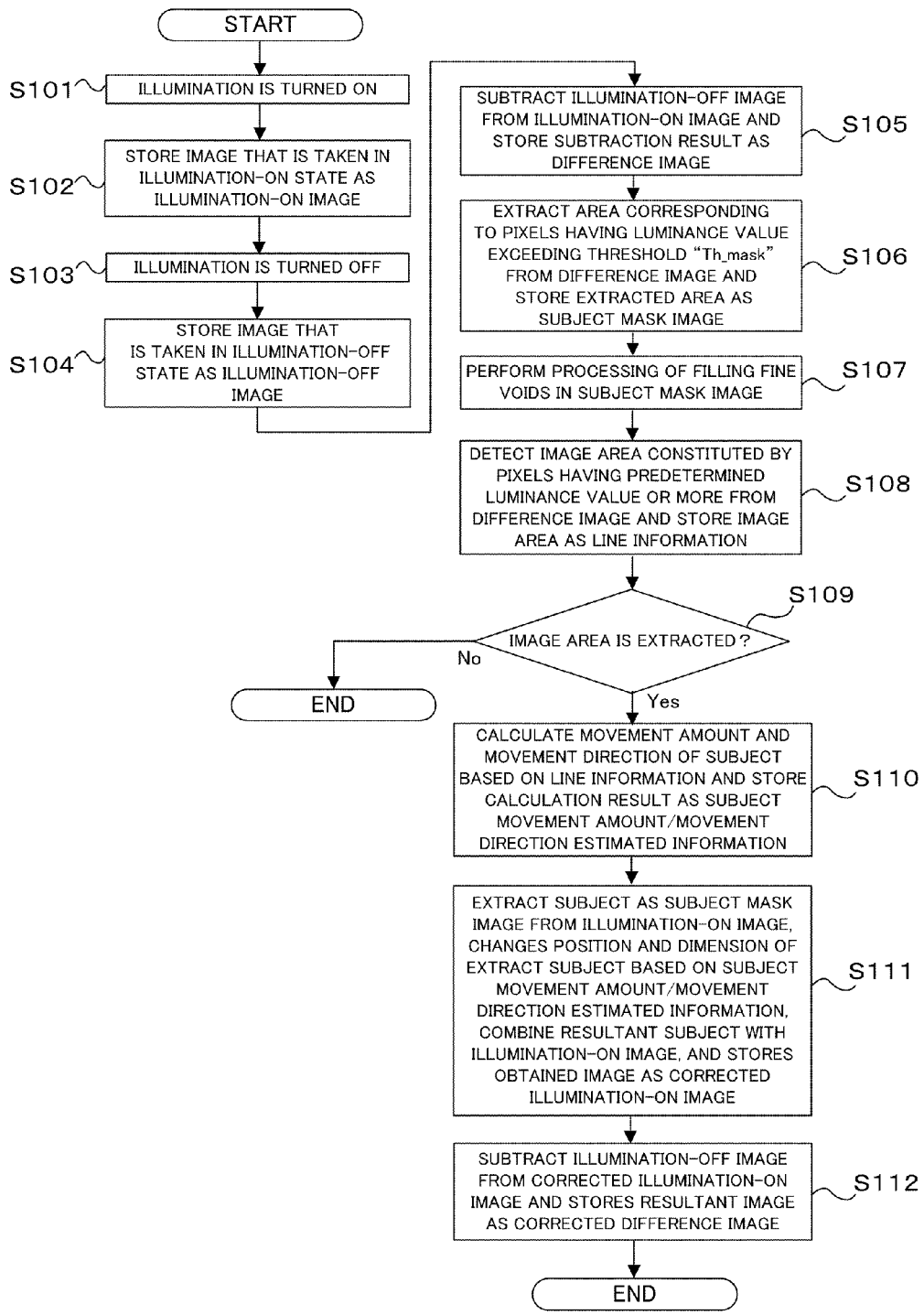
FIG. 2 is a flowchart illustrating a flow of processing (image processing method) performed in the image processing apparatus 1 according to the first embodiment of the present invention.

FIG. 2 is a flowchart illustrating a flow of processing (image processing method) performed in the image processing apparatus 1 according to the first embodiment of the present invention.

The image taking controller 203 controls the camera 202 to take an image of an object to be imaged in a state (at the illumination-on time) where the object to be imaged is illuminated by the illumination unit 201 (S101).

The image data taken in S101 is stored in the database 3 (S102). The second image acquisition section 102 acquires the image data (second image) thus stored in the database 3 (first image acquisition step).

The image taking controller 203 then controls the camera 202 to take an image of the object to be imaged in a state (at the illumination-off time) where the object to be imaged is not illuminated by the illumination unit 201 (S103).

The image data taken in S103 is stored in the database 3 (S104). The first image acquisition section 101 acquires the image data (first image) thus stored in the database 3 (second image acquisition step). Although the illumination-on image is first acquired and then the illumination-off image is acquired in the above description, the order of the image acquisition steps may be suitably set as long as both the illumination-on image and illumination-off image have been acquired before the execution of a difference image generation step to be described later.

Figure 3:
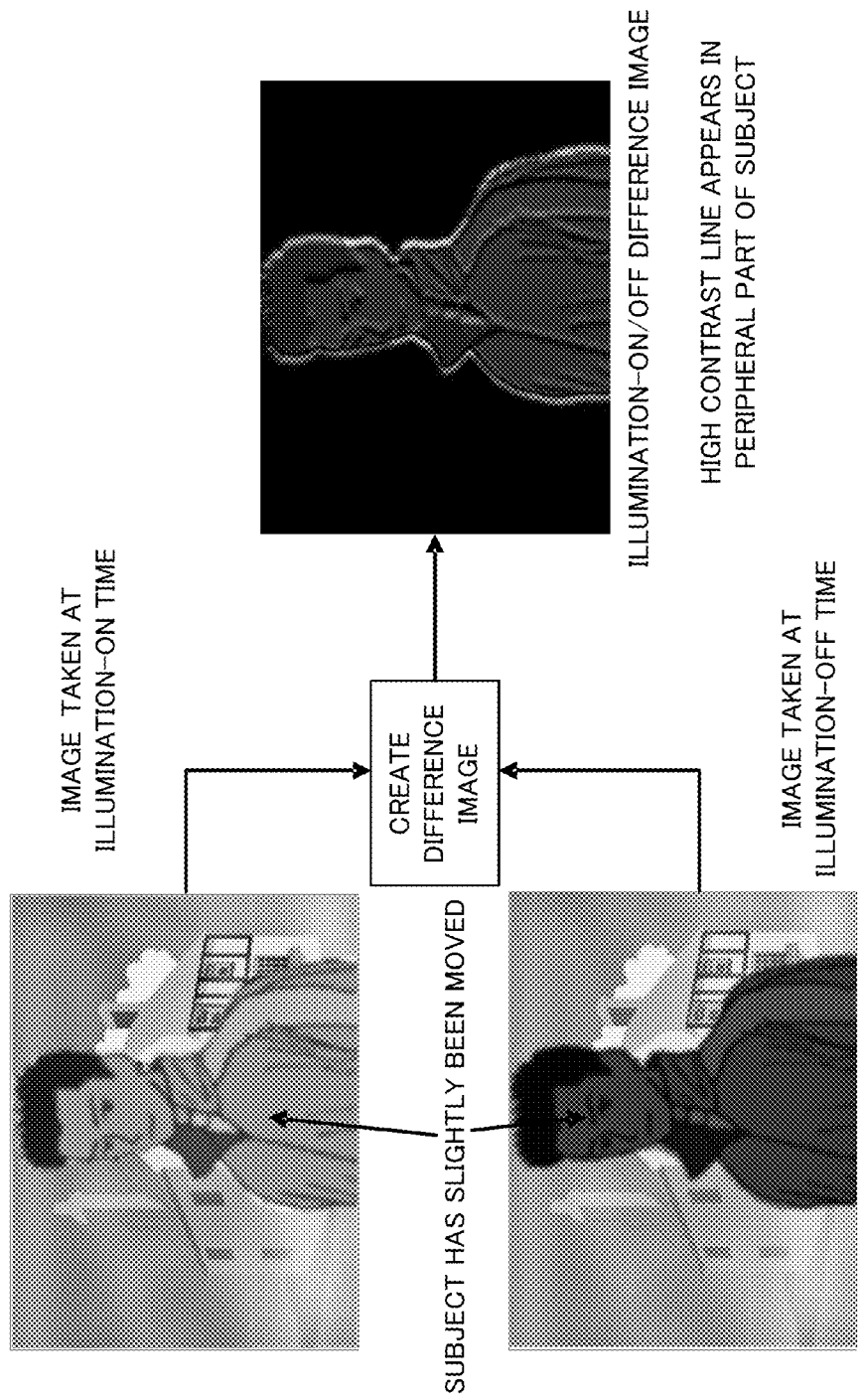
FIG. 3 is a view illustrating the outline of difference image generation processing and an example of a difference image.

The difference image generation section 103 generates a difference image representing a difference in the luminance between each of pixels constituting the image acquired in the first image acquisition step and each of pixels constituting the image acquired in the second image acquisition step (difference image generation step). The difference image thus generated is stored in the difference image storage area 303 provided in the database 3 (S105). FIG. 3 is a view illustrating the outline of the difference image generation processing and an example of the difference image. In the example of FIG. 3, a strong white line appears on the outline portion of a person which is the object to be imaged due to a positional displacement of the object to be imaged. The line width of the white line corresponds to the amount of the positional displacement of the object to be imaged, so that the movement amount of the subject may be estimated from the line width. Further, in the example of FIG. 3, the white line grows in the left-right direction, so that it may be understood that the object to be imaged is displaced in the left-right direction. In the case where the white line grows in the up-down direction, it may be understood that the object to be imaged is displaced in the up-down direction. In the case where the high contrast line appears uniformly in all directions, it may be estimated that the object to be imaged has been moved in the front-rear direction.

Figure 4:
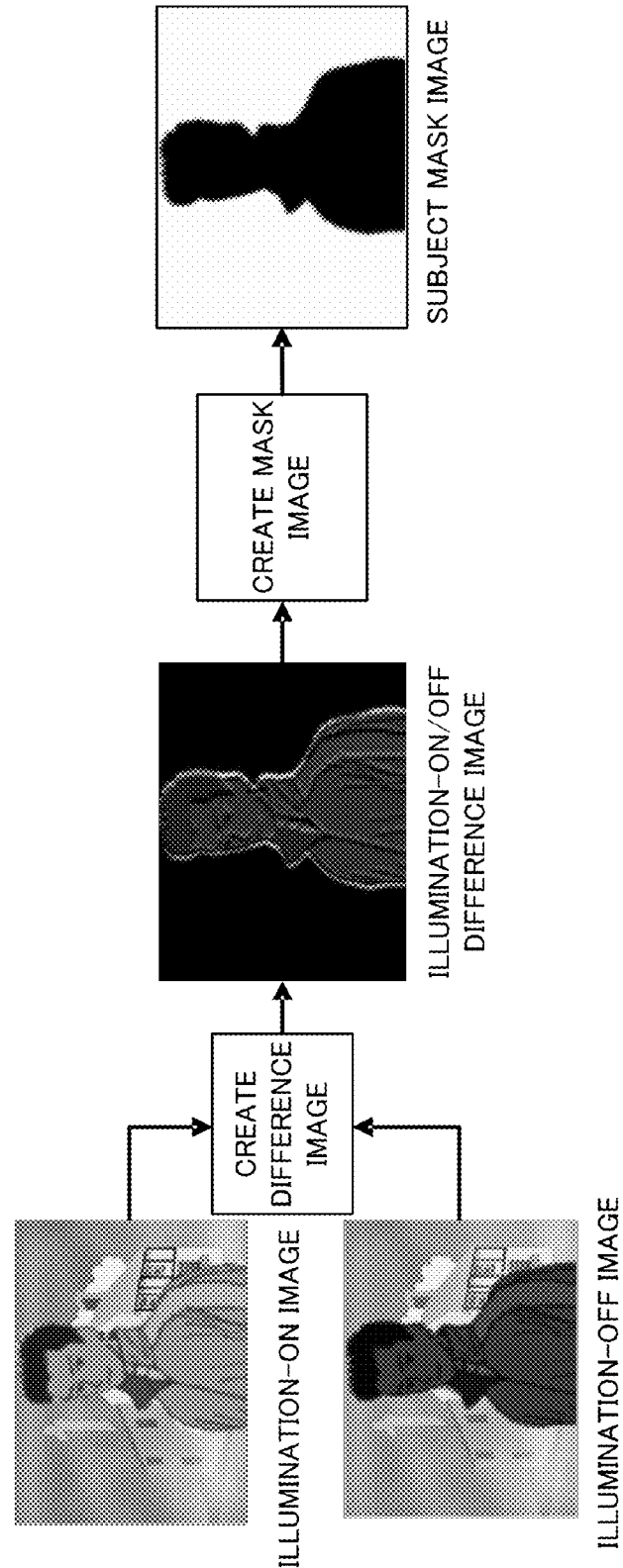
FIG. 4 is a view illustrating the outline of mask image generation processing and an example of a mask image.

The object area extraction section 104 extracts the area corresponding to pixels having luminance value exceeding a predetermined threshold "Th_mask" from the difference image generated in the difference image generation step and stores the extracted area in an object-to-be-imaged mask image storage area 304 in the database 3 as an object-to-be-imaged mask image (S106). FIG. 4 is a view illustrating the outline of the mask image generation processing and an example of the mask image.

Figure 5:
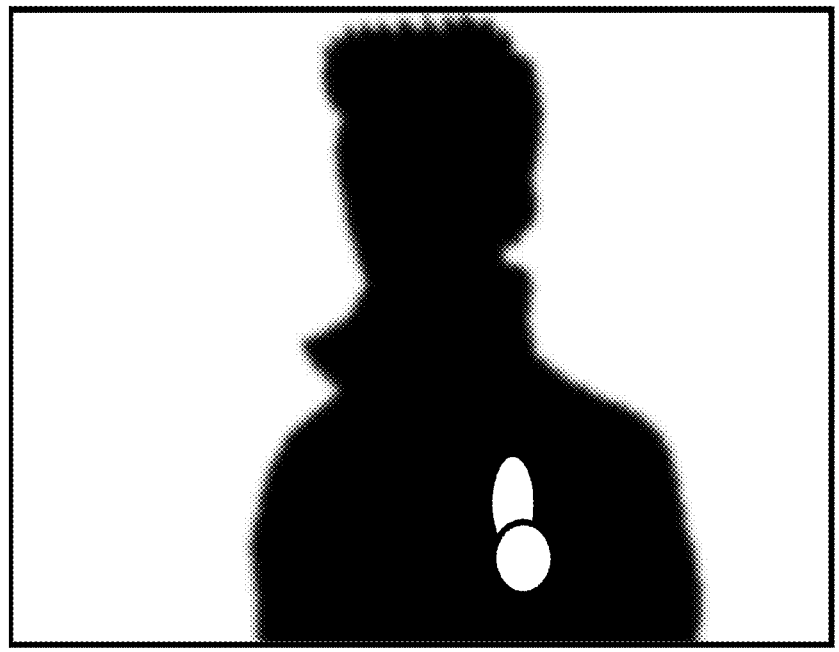
FIG. 5 is a view for explaining processing of filling fine voids in the mask image.
Figure 6:
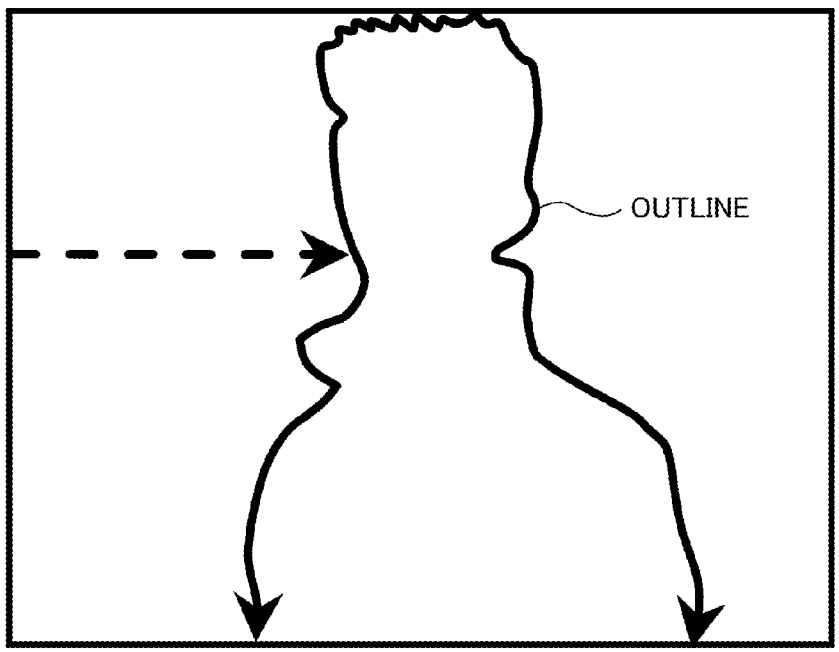
FIG. 6 is a view for explaining processing of filling fine voids in the mask image.`
Figure 7:
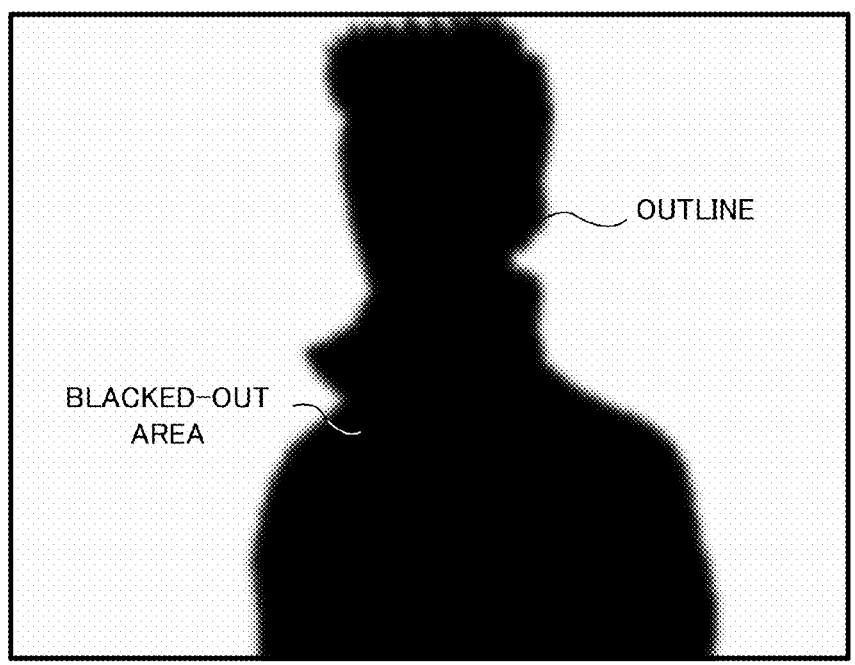
FIG. 7 is a view for explaining processing of filling fine voids in the mask image.

Then, the object area extraction section 104 performs processing of filling fine voids in the mask image thus generated (S107). FIGS. 5 to 7 are views for explaining the processing of filling fine voids in the mask image. When a void portion (hole-like portion) is formed inside the mask image due to influence of noise at the extraction processing of the mask image (see FIG. 5), the object area extraction section 104 performs the processing of filling the void portion.

Concretely, the object area extraction section 104 scans the mask image from outside thereof and traces the boundary portion of the mask image based on the point at which the scanning encounters the mask image to thereby create the outline of the mask image (see FIG. 6).

The object area extraction section 104 then blacks out the inside of the outline obtained by the above processing to complete the filling processing (see FIG. 7).

The high-luminance area extraction section 105 extracts the image area constituted by pixels having a predetermined luminance value or more from the difference image generated in the difference image generation step (high-luminance area extraction step). Information concerning the extracted image area is stored in a line information storage area 305 provided in the database 3 as "line information" (S108).

In the case where the image area having a linear shape has not been extracted in S108 (No in S109), the flow is ended.

On the other hand, in the case where the image area having a linear shape has been extracted in S108 (Yes in S109), the movement determination section 106 determines the movement amount (how much the object to be imaged has been moved) and movement direction (in which direction the object to be imaged has been moved) of the object to be imaged between the "image take timing when the camera 202 takes the illumination-off image" and "image take timing when the camera 202 takes the illumination-on image" based on the image area extracted in the high-luminance area extraction step (S110). The movement amount and movement direction of the object to be imaged calculated by the determination processing are stored in the database 3.

After completion of the determination (S110) of the movement amount and movement direction of the object to be imaged in the movement determination section 106, the object area extraction section 104 extracts, from one of the illumination-off image and illumination-on image, a pixel area corresponding to the object to be imaged based on the difference image and mask image generated in the difference image generation step (object area extraction step).

The correction processing section 107 makes a correction such that the position and dimension of the pixel area corresponding to the object to be imaged extracted from one of the illumination-off image and illumination-on image by the object area extraction section 104 on the image become substantially the same as those of the pixel area corresponding to the object to be imaged in the other one of the illumination-off image and illumination-on image (correction processing step) (S111).

The difference image generation section 103 generates a difference image from the illumination-off image and illumination-on image that have been subjected to the correction processing of the correction processing step and stores the generated difference image in the database 3 (S112).

Hereinafter, the determination method (S110) of the movement amount and movement direction of the object to be imaged employed by the movement determination section 106 will be described in detail.

Figure 8:
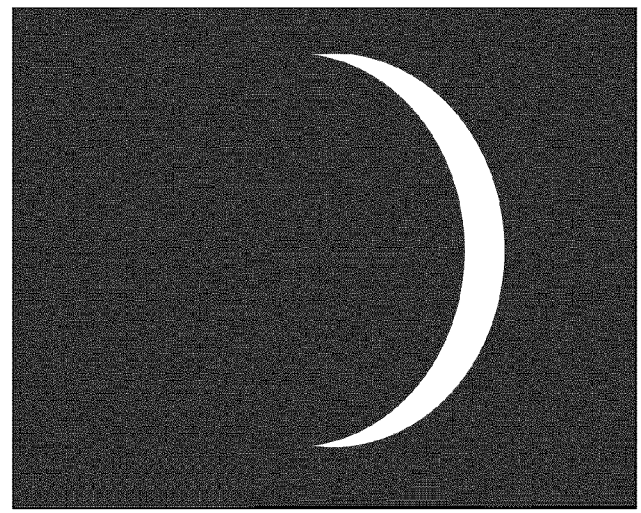
FIG. 8 is a view illustrating an example of a result obtained by applying binarization processing to a difference image generated in a difference image generation step.

FIG. 8 is a view illustrating an example of a result obtained by applying binarization processing to the difference image generated in the difference image generation step. In the binarization processing, pixels having a pixel value smaller than a predetermined threshold is made black, and pixels having a pixel value not smaller than the predetermined threshold is made white, whereby the resultant image has only black and white pixels.

Figure 9:
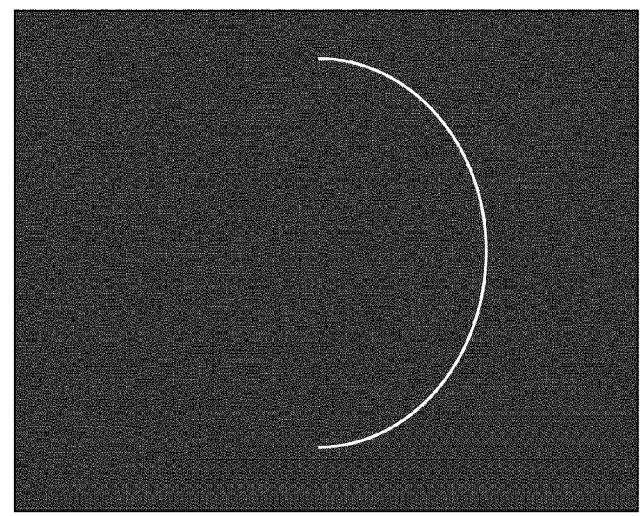
FIG. 9 is a view illustrating an example of a result obtained by applying "thinning processing" to the image obtained by applying the binarization processing to the difference image.

FIG. 9 is a view illustrating an example of a result obtained by applying "thinning processing" to the image obtained by applying the binarization processing to the difference image. In the thinning processing, an image constituted by a thick line or surface having a width of two or more pixels is made to be a line image having a width of one pixel. At this time, calculation is made such that the line image passes the center of the original thick line as much as possible.

Figure 10:
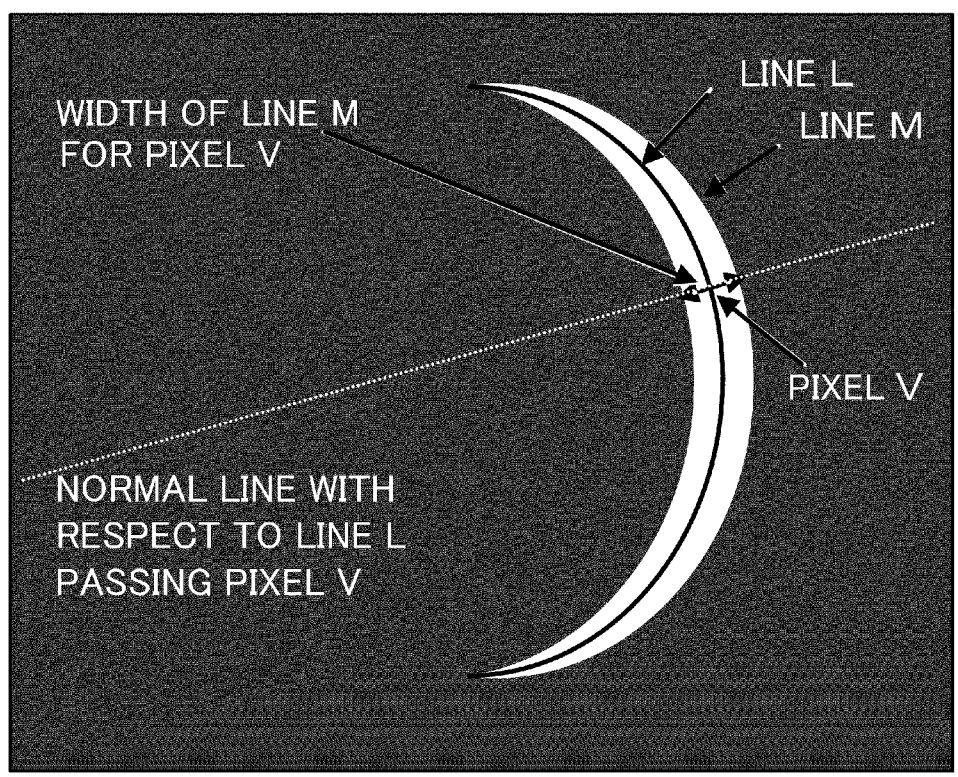
FIG. 10 is a view illustrating a method of calculating the line width of a high-luminance image area in the binarized image based on the result of the thinning processing.

FIG. 10 is a view illustrating a method of calculating the line width of the high-luminance image area in the binarized image based on the result of the thinning processing. It is assumed in FIG. 10 that a thick line before the thinning processing is "line M" and a line after the thinning processing having a width of one pixel is "line L". The movement determination section 106 checks the width of the line L at one position corresponding to a given pixel constituting the line L. At this time, the pixel on the line L may be checked every ten pixels for high-speed processing. A normal line with respect to the line L is drawn so as to pass a given pixel V on the line L. The length of the normal line on the line M is set as the width of the line M for the pixel V.

For example, the movement determination section 106 determines, as the movement amount, the largest dimension of the image area in the direction perpendicular to the thin line obtained as a result of the thinning processing applied to the image area extracted in the high-luminance area extraction step (see FIG. 11). In this case, the movement determination section 106 determines, as the movement direction of the object to be imaged, the direction perpendicular to the thin line obtained as a result of the thinning processing applied to the image area extracted in the high-luminance area extraction step at the position at which the dimension of the image area in the direction perpendicular to the thin line is largest.

In addition, the movement determination section 106 may determine, as the movement amount, a value obtained by averaging values of a top predetermined number of (e.g., top five) dimensions of the image area in the direction perpendicular to the thin line obtained as a result of the thinning processing applied to the image area extracted in the high-luminance area extraction step (see FIG. 12). In this case, the movement determination step may determine, as the movement direction of the object to be imaged, the average of the directions perpendicular to the thin line obtained as a result of the thinning processing applied to the image area extracted in the high-luminance area extraction step at a plurality of positions at which the top predetermined number of dimensions of the image area in the direction perpendicular to the thin line is obtained.

Figure 13:
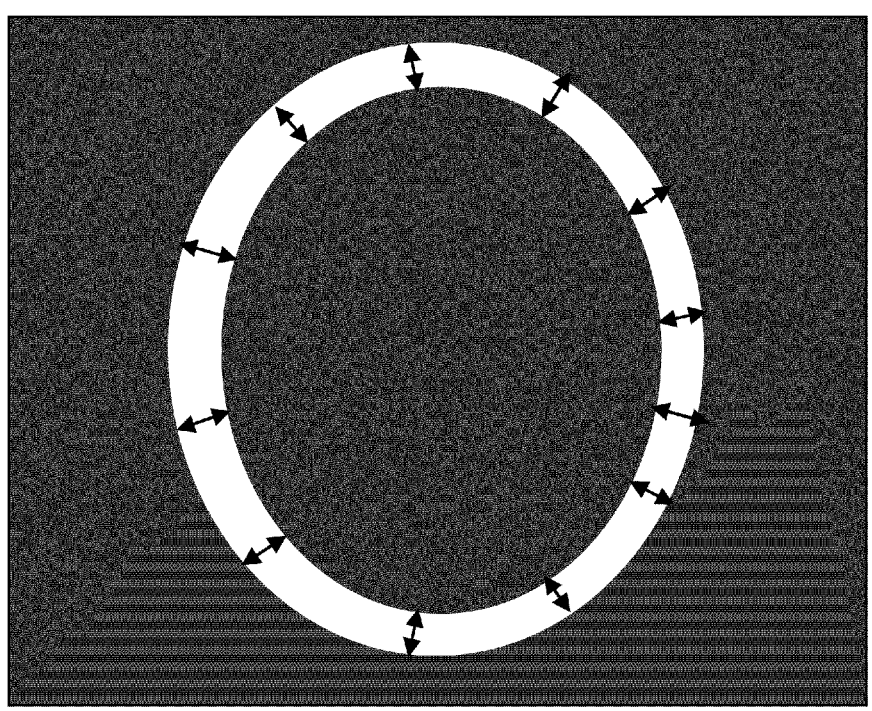
FIG. 13 is a view for explaining a determination method of the movement amount and movement direction employed by a movement determination section 106.

Further, in the case where a difference between each of dimensions of the image area in the direction perpendicular to the thin line obtained as a result of the thinning processing applied to the image area extracted in the high-luminance area extraction step at a predetermined number of positions on the thin line falls below a predetermined value (that is, dimensions at the plurality of predetermined positions are close to one another) (see FIG. 13), the movement determination section 106 may determine that the movement direction of the object to be imaged corresponds to the image take direction of the image taking apparatus (optical axis direction of an object lens of the camera) that takes an image of the object to be imaged.

Next, an example of the thinning processing that the movement determination section 106 applies to the difference image will be described. Various techniques are known as an algorithm of the thinning processing. The following is an example of the algorithm.

(1) The movement determination section 106 sets 0 to a variable "change_flag" indicating presence/absence of a change of a pixel value.

Figures 14, 15:
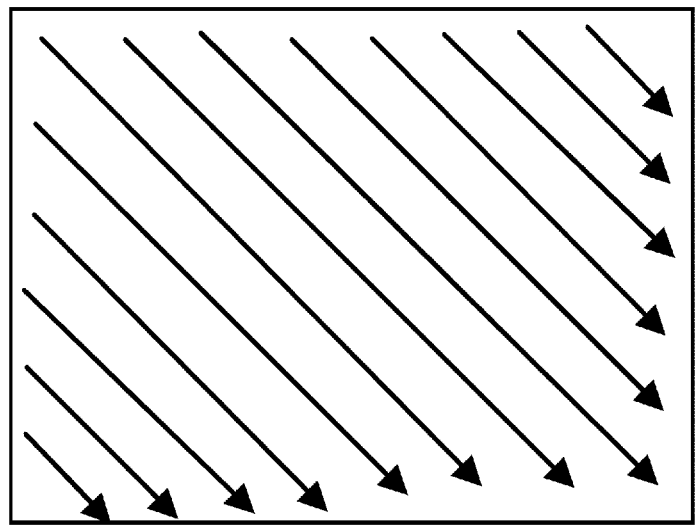
FIG. 14 is a view for explaining an algorithm of the thinning processing.
FIG. 15 is a view for explaining an algorithm of the thinning processing.

(2) Subsequently, as illustrated in FIG. 14, the movement determination section 106 obliquely scans the entire image from the upper left to lower right.

In the case where pixels surrounding a given pixel p in the course of the scanning assumes three states illustrated in FIG. 15, the movement determination section 106 changes the value of the pixel p to "0 (black)". At this time, the movement determination section 106 sets "1" into the variable "change_flag" to indicate that a change has been made to the pixel value (see FIG. 15) (in FIG. 15, 0 or 1 indicates the value of the pixel, and x is an arbitrary value).

Figures 16, 17:
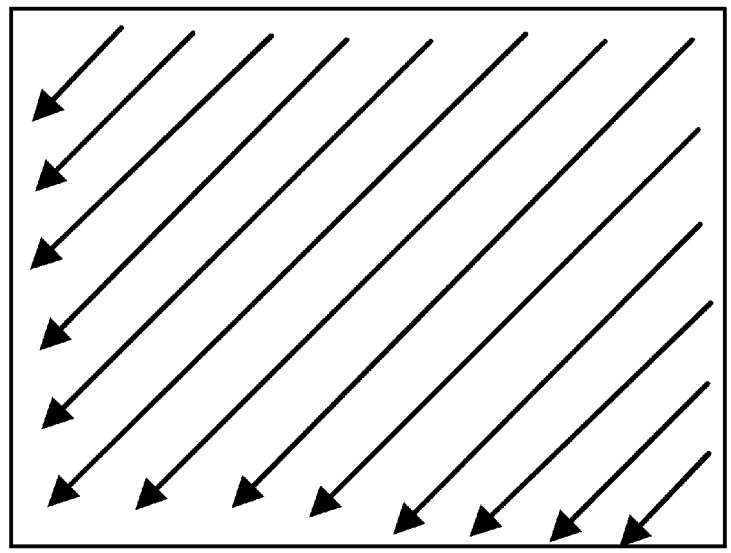
FIG. 16 is a view for explaining an algorithm of the thinning processing.
FIG. 17 is a view for explaining an algorithm of the thinning processing.

(3) Then, as illustrated in FIG. 16, the movement determination section 106 obliquely scans the entire image from the upper right to lower left.

In the case where pixels surrounding a given pixel p in the course of the scanning assumes three states illustrated in FIG. 17, the movement determination section 106 changes the value of the pixel p to "0 (black)". At this time, the movement determination section 106 sets "1" into the variable "change_flag" to indicate that a change has been made to the pixel value (see FIG. 17) (In FIG. 17, 0 or 1 indicates the value of the pixel, and x is an arbitrary value).

Figures 18, 19:
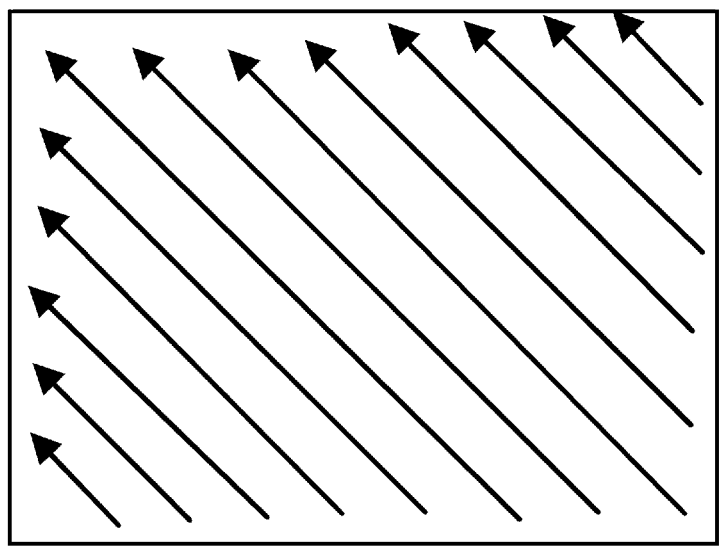
FIG. 18 is a view for explaining an algorithm of the thinning processing.
FIG. 19 is a view for explaining an algorithm of the thinning processing.

(4) Then, as illustrated in FIG. 18, the movement determination section 106 obliquely scans the entire image from the lower right to upper left.

In the case where pixels surrounding a given pixel p in the course of the scanning assumes three states illustrated in FIG. 19, the movement determination section 106 changes the value of the pixel p to "0 (black)". At this time, the movement determination section 106 sets "1" into the variable "change_flag" to indicate that a change has been made to the pixel value (see FIG. 19) (in FIG. 19, 0 or 1 indicates the value of the pixel, and x is an arbitrary value).

Figures 20, 21:
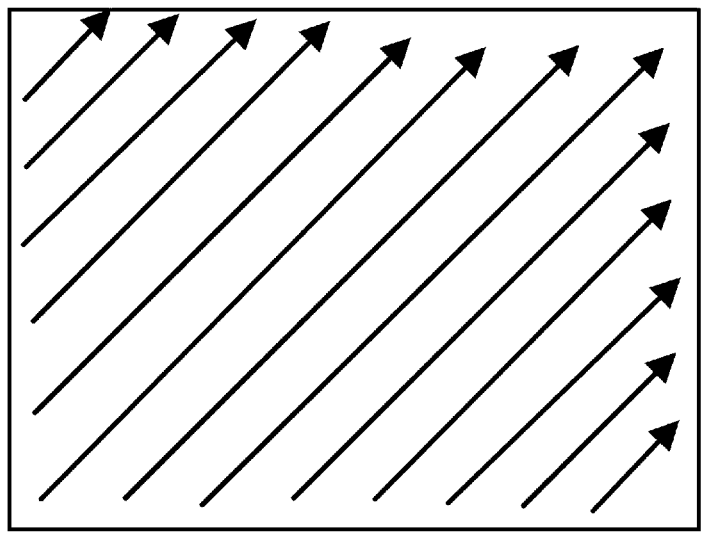
FIG. 20 is a view for explaining an algorithm of the thinning processing.
FIG. 21 is a view for explaining an algorithm of the thinning processing.

(5) Then, as illustrated in FIG. 20, the movement determination section 106 obliquely scans the entire image from the lower left to upper right.

In the case where pixels surrounding a given pixel p in the course of the scanning assumes three states illustrated in FIG. 21, the movement determination section 106 changes the value of the pixel p to "0 (black)". At this time, the movement determination section 106 sets "1" into the variable "change_flag" to indicate that a change has been made to the pixel value (see FIG. 21) (in FIG. 21, 0 or 1 indicates the value of the pixel, and x is an arbitrary value).

When the variable "change_flag" is "1", the movement determination section 106 returns to (1) and repeats the above processing. On the other hand, when the variable "change_flag" is "0", the thinning processing is ended.

Figure 22:
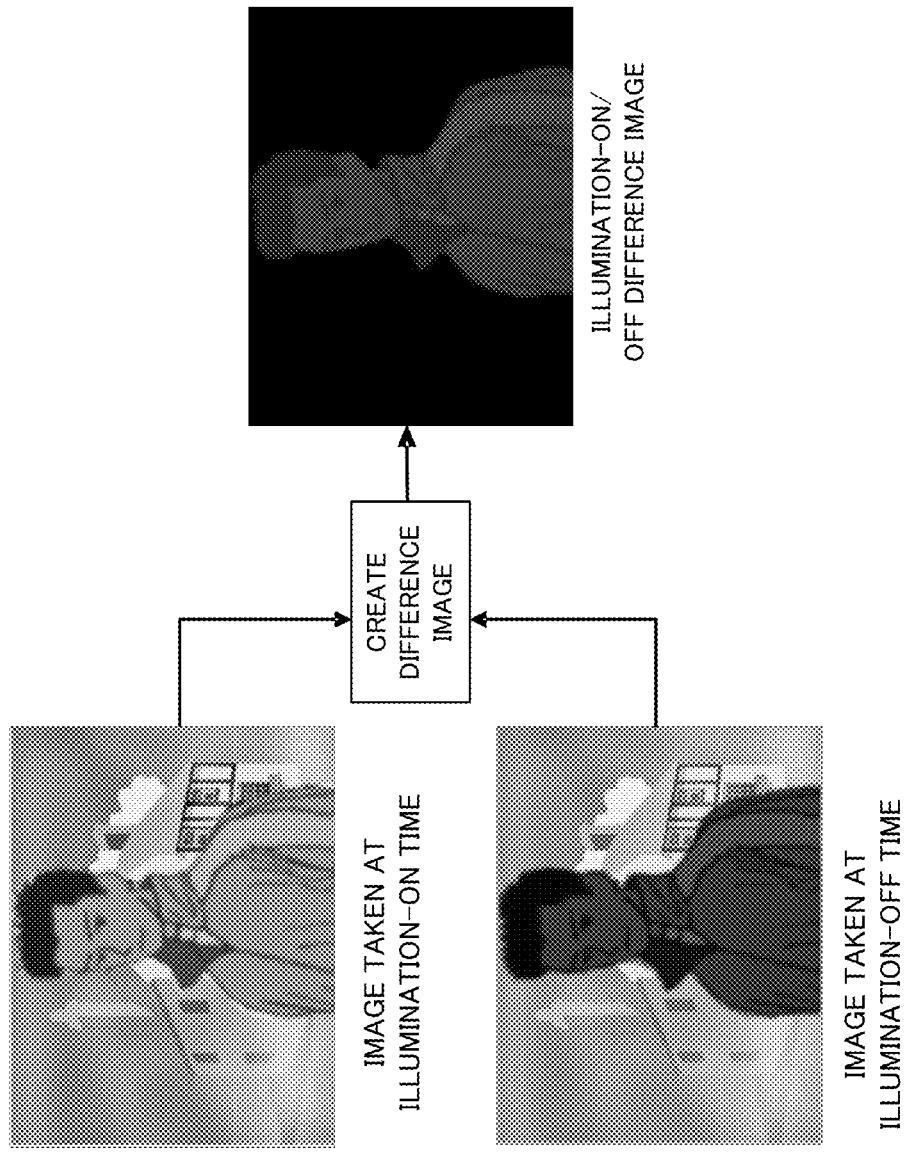
FIG. 22 is a view illustrating an example of an adequate difference image between the illumination-on image and illumination-off image obtained in the case where no positional displacement has occurred in the object to be imaged.

FIG. 22 is a view illustrating an example of an adequate difference image between the illumination-on image and illumination-off image obtained in the case where no positional displacement has occurred in the object to be imaged. As illustrated in FIG. 22, in the case where no positional displacement has occurred in the object to be imaged, a high-contrast linear pixel does not appear. Although appearing more obscure than the difference image obtained in the case where a positional displacement occurs in the object to be imaged, the difference image of FIG. 22 is an adequate illumination-on/off image. In the case where a positional displacement has occurred in the object to be imaged, not only that the high-contrast line appears in the peripheral portion of the outline, but also that the contrast of the pattern inside the subject becomes higher, resulting in an increase in the sharpness. However, since the contrast of the pattern is extraordinary enhanced as compared to that of an original subject, it may not be said that the difference image of FIG. 3 is an adequate difference image.

The mask image described using the flowchart illustrated in FIG. 2 may be subjected to correction based on the movement amount and movement direction of the object to be imaged before simply being extracted from the difference image.

Figure 23:
FIG. 23 is a view illustrating a state where the mask image has been expanded in the movement direction of the subject by an amount corresponding to the movement amount as compared to the original shape of the subject.
Figure 24:
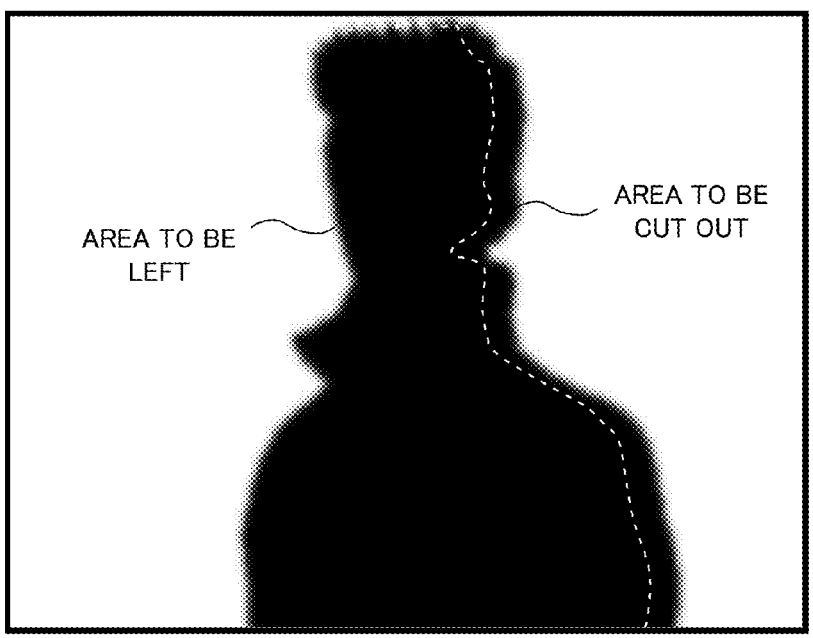
FIG. 24 is a view for explaining adjustment of the shape of the mask image.

The mask image is a logical OR of the subject images at the illumination-on time and illumination-off time and is thus expanded in the movement direction of the subject by an amount corresponding to the movement amount as compared to the original shape of the subject (see FIG. 23). In order to approximate the original shape, the mask image may be cut out after the movement amount and movement direction of the subject have been estimated based on the estimated movement amount/direction (see FIG. 24).

In the case where it is impossible to uniquely determine the movement amount and movement direction, for example, when there exist a plurality of directions in which the difference in the movement amount of the object to be imaged determined by the movement determination section 106 is not larger than a predetermined distance value, the correction processing section 107 makes a correction, based on each of the plurality of movement directions, such that the positions and dimensions of the two pixel areas extracted from the illumination-off image and illumination-on image by the object area extraction section 104 on the image become substantially the same (correction processing step).

The difference image generation section 103 generates the difference image between the two pixel areas that have been subjected to the correction processing by the correction processing section 107, and the movement determination section 106 selects the movement direction used in generation of a difference image having a smallest size of the image area extracted by the high-luminance area extraction section 105 from the plurality of difference images generated by the difference image generation section 103 and determines the selected direction as the direction of the object to be imaged. With this configuration, even in the case where it is impossible to uniquely determine the movement amount and movement direction of the subject, for example, when the movement amount of the subject is small, an optimum correction result may be obtained.

As described above, the high-contrast line is extracted from the illumination-on/off difference image, the movement amount and movement direction of the subject is estimated based on the width and direction of the extracted high-contrast line, and a difference image is created once again after the subject portion in one of the illumination-on image and illumination-off image is shifted based on the estimation, whereby a clear difference image free of subject blurring may be generated.

Further, a configuration may be adopted in which, after the difference image is used to roughly extract the object to be imaged, a pixel area corresponding to the roughly extracted object to be imaged is subjected to parallel movement or enlarge/reduction, followed by the generation of the difference image once again. With this configuration, even if the subject is moved slightly when a subject image free of influence of the background or ambient light is obtained using the generated difference image, an adequate subject image may be obtained. Thus, when a difference image in which subject blurring has been reduced is used for the purpose of authentication, it is possible to contribute to an improvement in the authentication accuracy.

(Second Embodiment)

Next, a second embodiment of the present invention will be described. The second embodiment is a modification of the first embodiment. Hereinafter, the same reference numerals are given to components having the same functions as those described in the first embodiment, and descriptions thereof are omitted.

Figure 25:
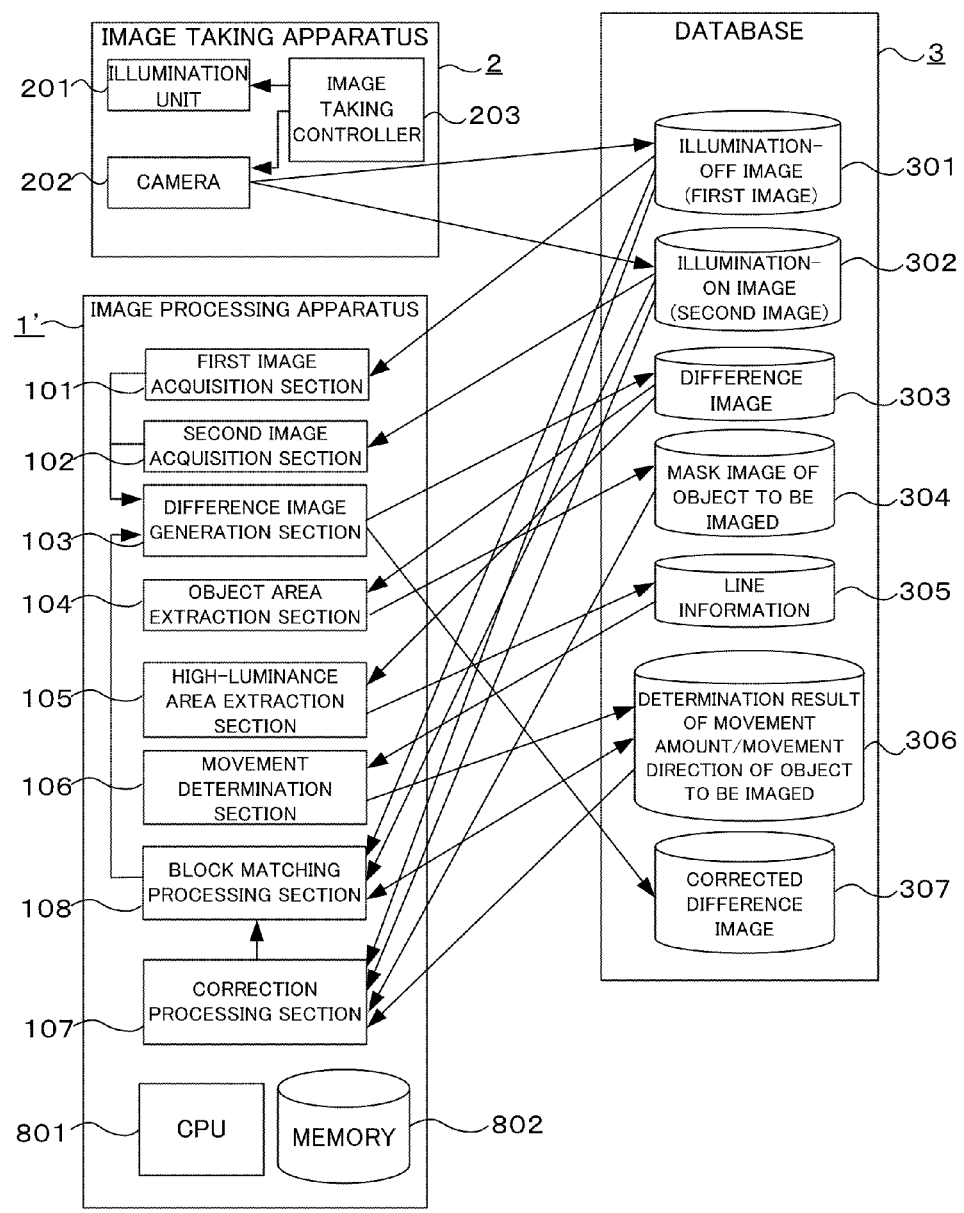
FIG. 25 is a functional block diagram for explaining a configuration of an image processing apparatus 1' according to a second embodiment of the present invention.

FIG. 25 is a functional block diagram for explaining a configuration of an image processing apparatus 1' according to the second embodiment of the present invention. The image processing apparatus 1' according to the present embodiment includes a block matching processing section 108 in addition to the components of the image processing apparatus 1 of the first embodiment.

In the image processing apparatus 1' according to the present embodiment, the correction processing section 107 makes a correction, based on the movement amount determined by the movement amount determination section 106, such that the position and dimension of the pixel area corresponding to the object to be imaged extracted by the object area extraction section on the image become substantially the same as those of the pixel area corresponding to the object to be imaged in the other one of the first and second images.

Then, the block matching processing section 108 applies block matching processing between the first and second images that have been subjected to the correction processing by the correction processing section 107. The difference image generation section 103 generates a difference image between the two pixel areas that have been subjected to the block matching processing by the block matching processing section 108. As a result, a higher accurate difference image may be obtained.

Figure 26:
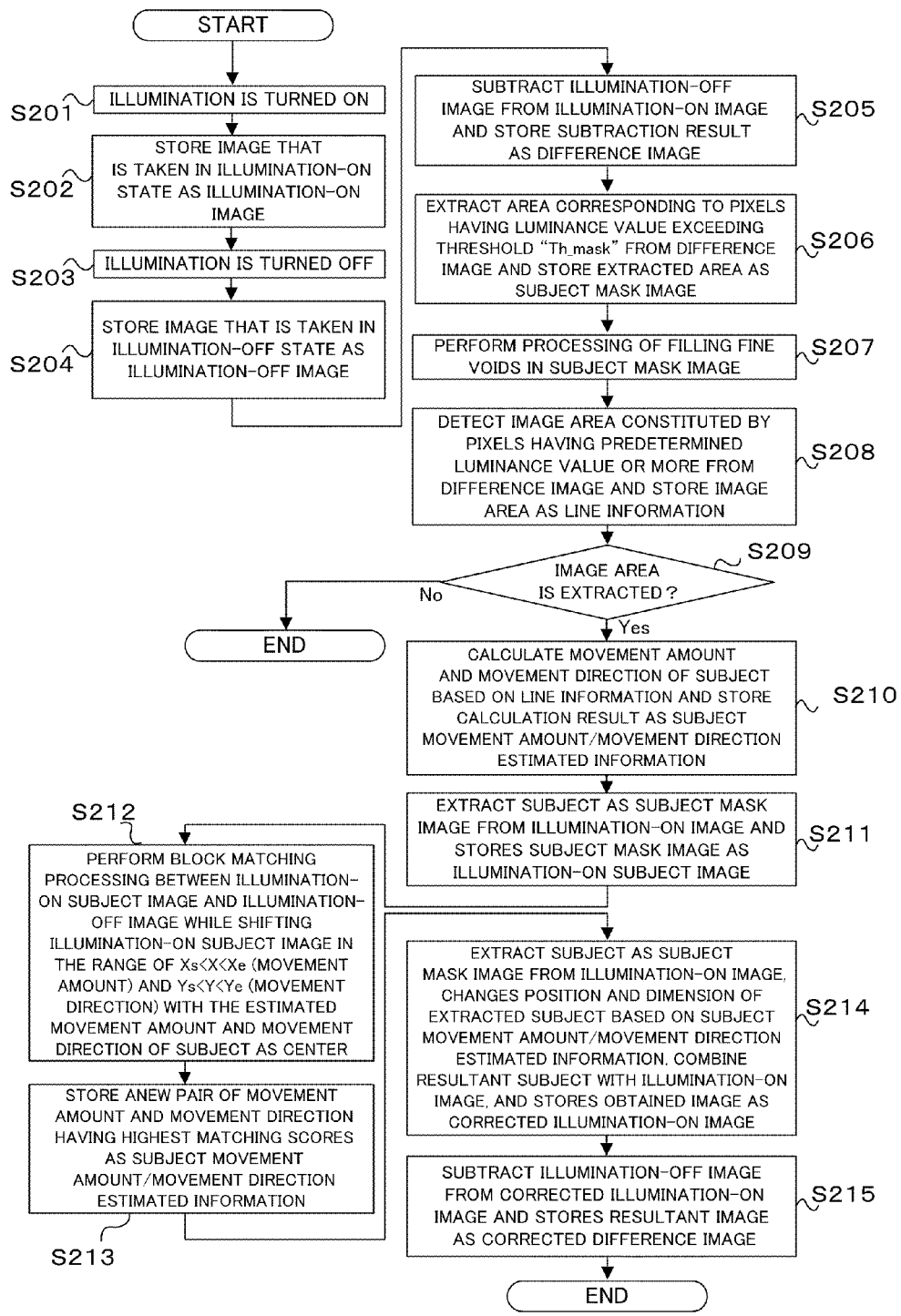
FIG. 26 is a flowchart illustrating a flow of processing (image processing method) performed in the image processing apparatus according to the second embodiment of the present invention.

FIG. 26 is a flowchart illustrating a flow of processing (image processing method) performed in the image processing apparatus according to the second embodiment of the present invention. The processing of steps S201 to S210, step S214 and step S215 in the flowchart of FIG. 26 is the same as the processing of steps S101 to S110, step S111 and step S112 in the flowchart of FIG. 2, so that the descriptions thereof are omitted.

The correction processing section 107 makes a correction, based on the movement amount determined in the movement amount determination step (S210), such that the position and dimension of the pixel area extracted in the object area extraction step (S211) on the image become substantially the same as those of the pixel area corresponding to the object to be imaged in the other one of the first and second images (correction processing step).

The block matching processing section 108 applies the block matching processing between the first and second images that have been subjected to the correction processing in the correction processing step and then performs highly accurate position alignment between the two images (block matching processing step) (S212).

The block matching processing section 108 registers the movement amount and movement direction having the highest matching scores in the database 3 anew (S213) and the flow advances to the difference image generation processing of the difference image generation step.

A configuration may be employed in which the block matching processing may be performed before application of the correction processing. In this case, however, a large number of candidates need to be matched to one another, taking much processing time. On the other hand, according to the present embodiment, the block matching processing is carried out as final correction processing, so that a highly accurate difference image may be obtained with a reduced processing load.

(Third Embodiment)

Next, a third embodiment of the present invention will be described. The third embodiment is a modification of the first embodiment. Hereinafter, the same reference numerals are given to components having the same functions as those described in the first embodiment, and descriptions thereof are omitted.

Figure 27:
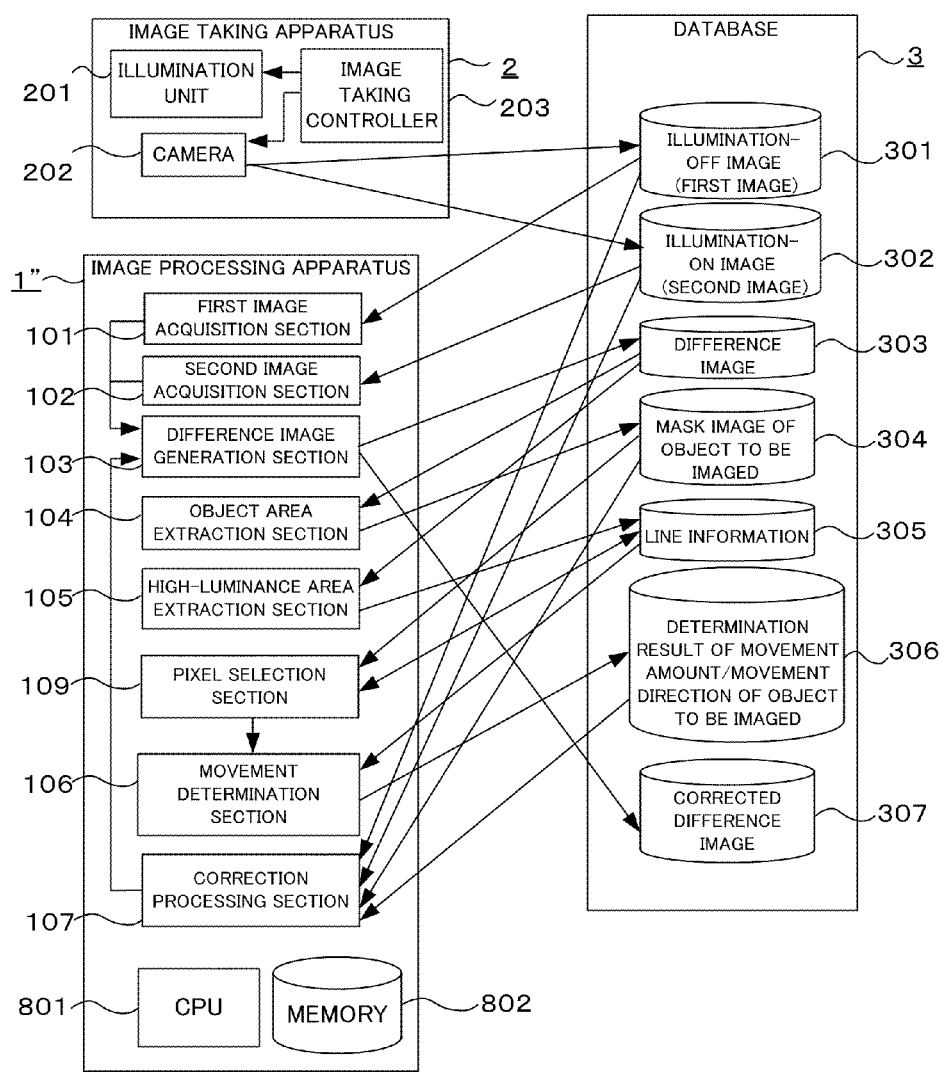
FIG. 27 is a functional block diagram for explaining a configuration of an image processing apparatus 1" according to a third embodiment of the present invention.

FIG. 27 is a functional block diagram for explaining a configuration of an image processing apparatus 1" according to the third embodiment of the present invention. The image processing apparatus 1' according to the present embodiment includes a pixel selection section 109 in addition to the components of the image processing apparatus 1 of the first embodiment.

The pixel selection section 109 selects only pixels corresponding to the outline portion of the pixel area extracted by the object area extraction section 104 or pixels existing inside the outline portion thereof.

The movement determination section 106 determines the movement amount and movement direction of the object to be imaged based on the pixels selected by the pixel selection section 109. This configuration suppresses occurrence of extraction processing of unnecessary line segments, thereby effectively obtaining a highly accurate correction result.

Figure 28:
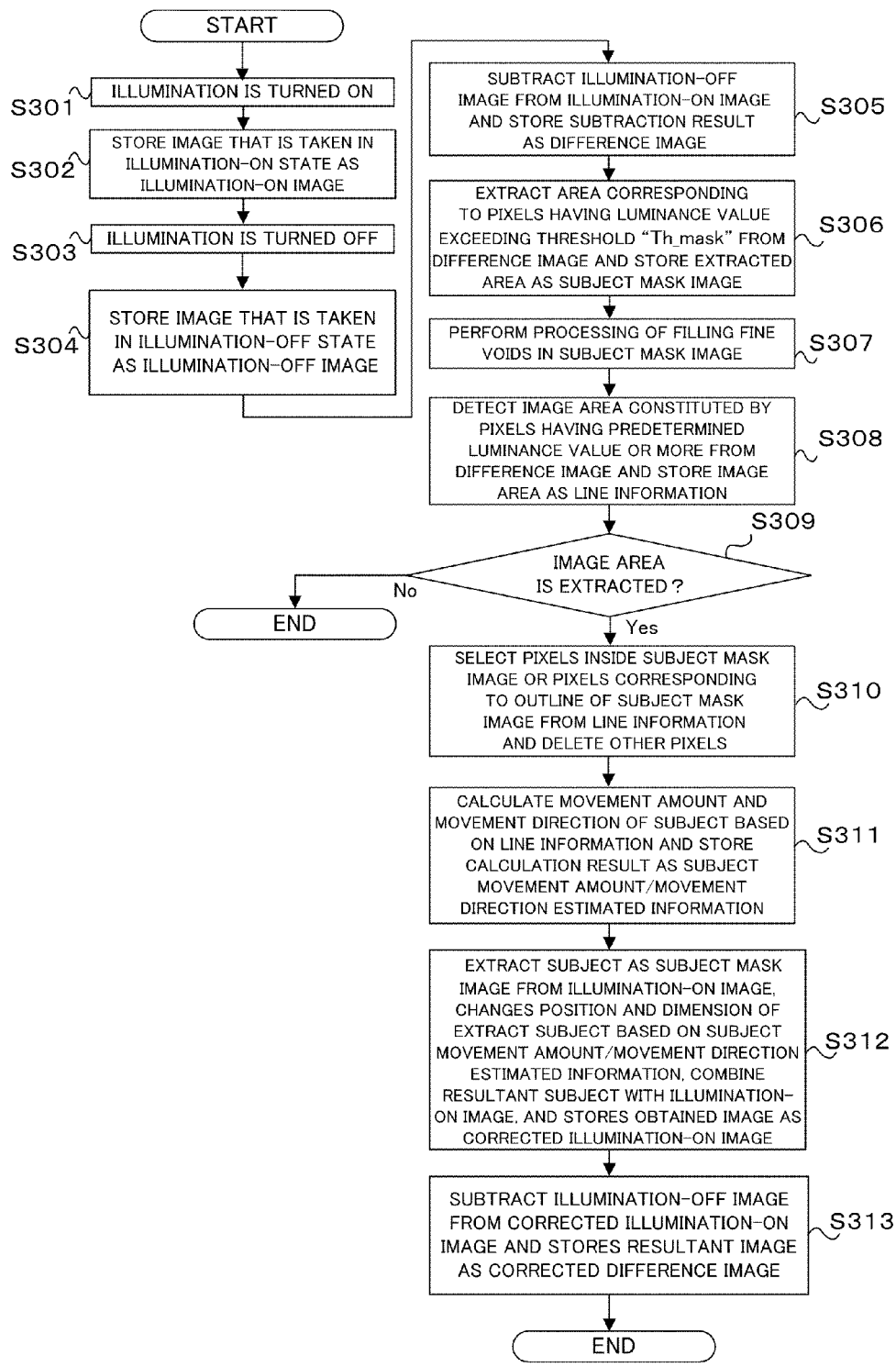
FIG. 28 is a flowchart illustrating a flow of processing (image processing method) performed in the image processing apparatus according to the third embodiment of the present invention.

FIG. 28 is a flowchart illustrating a flow of processing (image processing method) performed in the image processing apparatus according to the third embodiment of the present invention. The processing of steps S301 to S309 and steps S311 to S313 in the flowchart of FIG. 28 is the same as the processing of steps S101 to S109 and steps S110 to S112 in the flowchart of FIG. 2, so that the descriptions thereof are omitted.

The pixel selection section 109 selects only pixels corresponding to the outline portion of the pixel area (object-to-be-imaged mask image) extracted in the object area extraction step or pixels existing inside the outline portion thereof (pixel selection step) (S310).

The movement determination step applies the thinning processing only to the pixels selected in the pixel selection step to determine the movement amount and movement direction of the object to be imaged.

Figure 29:
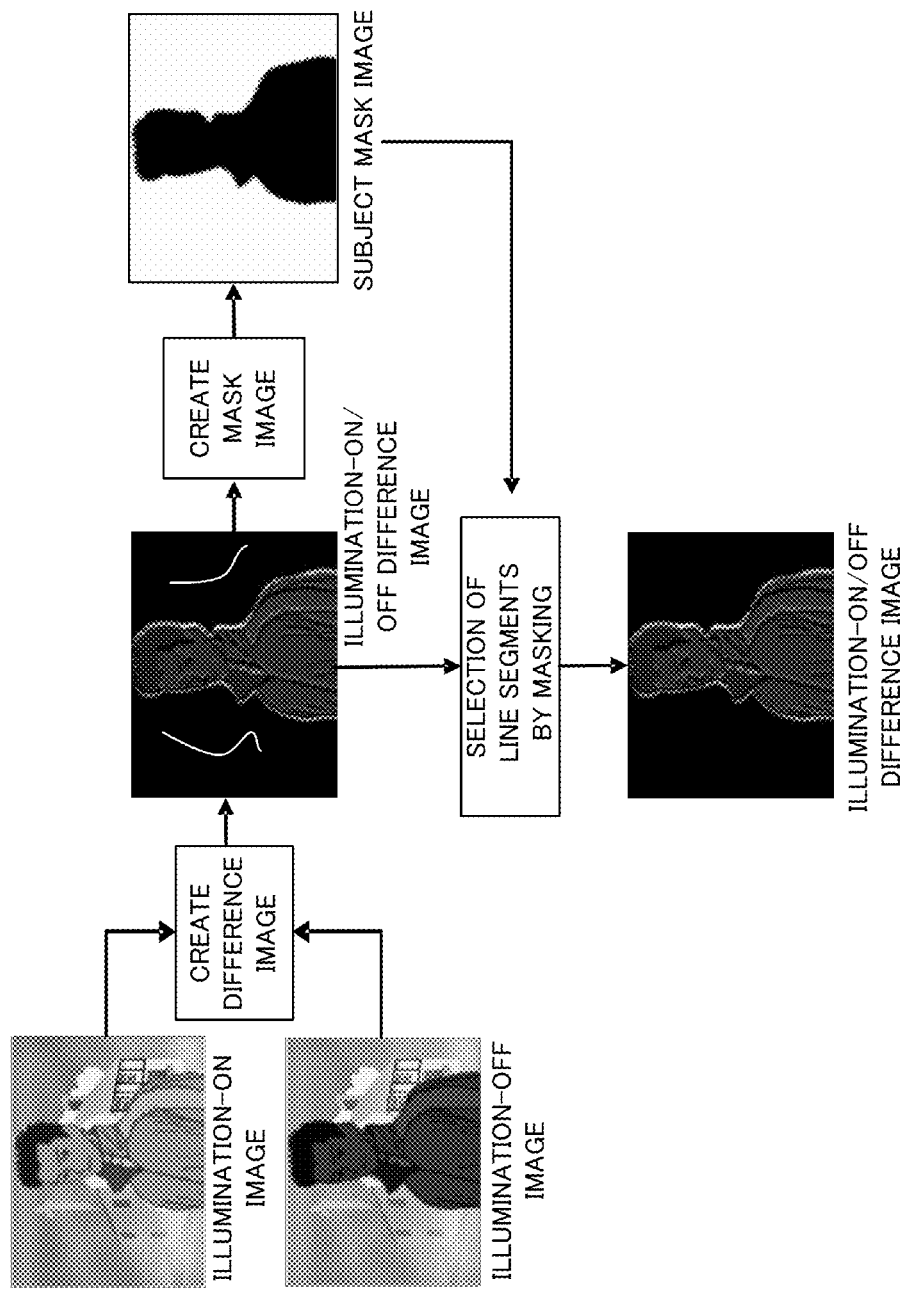
FIG. 29 is a view for explaining a technique for removing unwanted line segments and the like using a mask image.

In the case where unwanted objects other than the subject is present in a taken image or where unwanted line segments appear in the illumination-on/off images due to influence of ambient light, the unwanted objects or line segments may be removed using the object-to-be-imaged mask image (see FIG. 29). As a result, accuracy of blurring correction during generation of a difference image of the object to be imaged may be enhanced.

In the above embodiments, illuminance correction processing for enhancing the subject or lines may be performed at the time of generation of the difference image by the difference image generation processing 103 or at the time of extraction of the line area in the determination processing by the movement determination processing 106.

Although a person is set as the object to be imaged in the above embodiments, the present invention is not limited to this. For example, a palm may be set as the object to be imaged. In this case, "palm vein authentication" may be realized based on obtained image data.

In the case where an image of a palm is taken for "palm vein authentication", a camera and the palm are apart from each other by a distance of only several centimeters, that is, the image of the palm is taken at a close distance. When an image of an object is taken by a camera at a close distance as described above, a difference in brightness is likely to become large between the object to be imaged and its background. In the case where the difference in the brightness between the object to be imaged and its background becomes significantly large as described above, it is preferable that the difference image generated by the difference image generation section is binarized so as to allow a threshold used in creation of the line image or mask image to be adjusted in accordance with ambient illumination condition.

The present invention produces its effect not only in an image taking apparatus that takes the image of the palm for "palm vain authentication", but also in an image taking apparatus that takes an image of an object (e.g., face, pupil, fingerprint) to be imaged with substantially the same background (under image taking condition in which the background is fixed) so as to obtain the illumination-on image and illumination-off image.

Although the image processing apparatus according to the present invention is provided separately from the image taking apparatus 2 and the image processing apparatus itself may be provided independently in the above embodiments, the present invention is not limited to this. For example, the image processing apparatus according to each of the above embodiments may be incorporated in the image taking apparatus. In this case, the image taking apparatus may exhibit the effect produced by the image processing apparatus according to the present invention. As a matter of course, not all the components constituting the image processing apparatus but only a part of them may be incorporated in the image taking apparatus. In this case, the function of the image processing apparatus according to the present invention is realized by an image processing system including the image processing apparatus and image taking apparatus.

The above respective steps performed in the image processing apparatus is realized by the CPU 801 executing an image processing program stored in the MEMORY 802.

Further, it is possible to provide a program that allows a computer constituting the image processing apparatus to execute the above steps as an image processing program. By storing the above program in a computer-readable storage medium, it is possible to allow the computer constituting the image processing apparatus to execute the program. The computer-readable medium mentioned here includes: an internal storage device mounted in a computer, such as ROM or RAM, a portable storage medium such as a CD-ROM, a flexible disk, a DVD disk, a magneto-optical disk, or an IC card; a database that holds computer program; another computer and database thereof; and a transmission medium on a network line.

As described above, according to the present invention, it is possible to provide an image processing technique, in which an object to be imaged on a taken image is extracted based on an image obtained by taking an image of the object to be imaged at the time of non-illumination at which the object to be imaged is not illuminated and an image obtained by taking an image of the object at the time of illumination at which the object to be imaged is illuminated, capable of highly accurately extracting the object to be imaged with a simple apparatus configuration and less processing load.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An image processing apparatus comprising:
a first image acquisition section that acquires a first image obtained by taking an image of an object to be imaged at illumination-off time at which the object is not illuminated;
a second image acquisition section that acquires a second image obtained by taking an image of the object at illumination-on time at which the object is illuminated;
a difference image generation section that generates a difference image based on a difference between luminance of each of pixels constituting the first image acquired by the first image acquisition section and luminance of each of pixels constituting the second image acquired by the second image acquisition section;
a high-luminance area extraction section that extracts an image area constituted by pixels having a luminance value which is equal to or more than a predetermined luminance value from the difference image generated by the difference image generation section; and
a movement determination section that determines, based on the image area extracted by the high-luminance area extraction section, a movement amount of the object between image take timing of the first image and image take timing of the second image.

2. The image processing apparatus according to claim 1, further comprising:
an object area extraction section that extracts a pixel area corresponding to the object from one of the first image and the second image based on the difference image generated by the difference image generation section; and
a correction processing section that corrects, based on the movement amount determined by the movement amount determination section, the one of the first image and the second image so that a position and a dimension of the pixel area extracted by the object area extraction section on the one of the first image and the second image become the same as those of a pixel area corresponding to the object in the other one of the first image and the second image, wherein
the difference image generation section generates a difference image between the first image and the second image that are subjected to correction processing performed by the correction processing section.

3. The image processing apparatus according to claim 1, wherein
the movement determination section determines, as the movement amount, based on a largest dimension of the image area in a direction perpendicular to a thin line obtained as a result of thinning processing applied to the image area extracted by the high-luminance area extraction section.

4. The image processing apparatus according to claim 1, wherein
the movement determination section determines, as the movement direction of the object, a direction perpendicular to a thin line obtained as a result of thinning processing applied to the image area extracted by the high-luminance area extraction section at a position at which the dimension of the image area in the direction perpendicular to the thin line is largest.

5. The image processing apparatus according to claim 1, wherein
the movement amount determination section determines, as the movement amount, a value obtained by averaging values of a top predetermined number of dimensions of the image area in a direction perpendicular to a thin line obtained as a result of thinning processing applied to the image area extracted by the high-luminance area extraction section.

6. The image processing apparatus according to claim 1, wherein
the movement determination section determines, as the movement direction of the object, an average of directions perpendicular to a thin line obtained as a result of thinning processing applied to the image area extracted by the high-luminance area extraction section at a plurality of positions at which the top predetermined number of dimensions of the image area in the direction perpendicular to the thin line is obtained.

7. The image processing apparatus according to claim 1, wherein
in the case where a difference between each of dimensions of the image area in a direction perpendicular to a thin line obtained as a result of thinning processing applied to the image area extracted by the high-luminance area extraction section at a plurality positions on the thin line falls below a predetermined value, the movement determination section determines that the movement direction of the object corresponds to the image take direction of the object.

8. The image processing apparatus according to claim 2, further comprising:
a correction processing section that corrects, in the case where the movement amount of the object determined by the movement determination section exhibits a plurality of directions and where a difference between the movement amounts in the plurality of directions is equal to or smaller than a predetermined distance value, one of the first image and the second image based on each of the plurality of movement directions so that positions and dimensions of the pixel area extracted from the one of the first image and the second image extracted by the object area extraction section on the one of the first image and the second image become the same as those of the pixel area corresponding to the object in the other one of the first and second images, wherein
the difference image generation section generates a difference image between the first image and the second image that are subjected to correction processing performed by the correction processing section, and
the movement determination section selects a movement direction used in generation of a difference image having a smallest size of the image area extracted by the high-luminance area extraction section from a plurality of difference images generated by the difference image generation section and determines the selected direction as the movement direction of the object.

9. The image processing apparatus according to claim 2, further comprising:
a correction processing section that corrects, based on the movement amount determined by the movement amount determination section, one of the first image and the second image so that a position and a dimension of the pixel area extracted by the object area extraction section on the one of the first image and the second image become the same as those of the pixel area corresponding to the object in the other one of the first and second images; and
a block matching processing section that applies block matching processing between the first image and the second image that are subjected to correction processing performed by the correction processing section, wherein
the difference image generation section generates a difference image between the first image and the second image that are subjected to the block matching processing performed by the block matching processing section.

10. The image processing apparatus according to claim 2, wherein
the object area extraction section extracts a pixel area constituted by pixels having a value exceeding a predetermined pixel value from the difference image generated by the difference image generation section as the pixel area corresponding to the object.

11. The image processing apparatus according to claim 2, further comprising
a pixel selection section that selects only pixels corresponding to an outline portion of the pixel area extracted by the object extraction section or pixels existing inside the outline portion thereof, wherein
the movement determination section determines the movement amount and movement direction of the object based on the pixels selected by the pixel selection section.

12. An image processing method comprising:
acquiring one of a first image obtained by taking an image of an object to be imaged at illumination-off time at which the object is not illuminated and a second image obtained by taking an image of the object at illumination-on time at which the object is illuminated;

acquiring the other one of the first image and the second images;

generating a difference image based on a difference between luminance of each of pixels constituting an image acquired in the acquiring of the one of the first image and the second image and luminance of each of pixels constituting an image acquired in the acquiring of the other one;

extracting an image area constituted by pixels having a luminance value which is equal to or more than a predetermined luminance value from the difference image generated in the generating; and determining a movement amount of the object between image take timing of the first image and image take timing of the second image based on the image area extracted in the extracting.

13. The image processing method according to claim 12, further comprising:

extracting a pixel area corresponding to the object from one of the first image and the second image based on the difference image generated in the generating; and based on the movement amount determined in the determining, correcting the one of the first image and the second image so that a position and a dimension of the pixel area extracted in the extracting of the object area on the one of the first image and the second image become the same as those of a pixel area corresponding to the object in the other one of the first image and the second image, wherein the generating of the difference image generates a difference image between the first image and the second image that are subjected to correction processing performed in the correcting.

14. The image processing method according to claim 12, wherein the determining determines, as the movement amount, a value obtained by averaging values of a top predetermined number of dimensions of the image area in a direction perpendicular to a thin line obtained as a result of thinning processing applied to the image area extracted in the extracting of the image area.

15. The image processing method according to claim 12, wherein the determining determines, as the movement direction of the object, an average of directions perpendicular to a thin line obtained as a result of thinning processing applied to the image area extracted in the extracting of the image area at a plurality of positions at which the top predetermined number of dimensions of the image area in the direction perpendicular to the thin line is obtained.

16. The image processing method according to claim 13, further comprising in the case where the movement amount of the object determined in the determining exhibits a plurality of directions and where a difference between the movement amounts in the plurality of directions is equal to or smaller than a predetermined distance value, correcting one of the first image and the second image based on each of the plurality of movement directions so that positions and dimensions of the pixel area extracted from the one of the first image and the second image extracted in the extracting of the object area on the one of the first image and the second image become the same as those of the pixel area corresponding to the object in the other one of the first image and the second image, wherein the generating generates a difference image between the first image and the second image that are subjected to correction processing performed in the correcting, and the determining selects a movement direction used in generation of a difference image having a smallest size of the image area extracted in the extracting of the image area from a plurality of difference images generated in the generating and determines the selected direction as the movement direction of the object.

17. A non-transitory computer-readable medium having recorded thereon an image processing program that causes a computer to execute a process comprising: acquiring one of a first image obtained by taking an image of an object to be imaged at illumination-off time at which the object is not illuminated and a second image obtained by taking an image of the object at illumination-on time at which the object is illuminated; acquiring the other one of the first image and the second images; generating a difference image based on a difference between luminance of each of pixels constituting an image acquired in the acquiring of the one of the first image and the second image and luminance of each of pixels constituting an image acquired in the acquiring of the other one; extracting an image area constituted by pixels having a luminance value which is equal to or more than a predetermined luminance value from the difference image generated in the generating; and determining a movement amount of the object between image take timing of the first image and image take timing of the second image based on the image area extracted in the extracting.

18. The non-transitory computer-readable medium according to claim 17, wherein the process further comprises: extracting a pixel area corresponding to the object from one of the first image and the second image based on the difference image generated in the generating; and based on the movement amount determined in the determining, correcting the one of the first image and the second image so that a position and a dimension of the pixel area extracted in the extracting of the object area on the one of the first image and the second image become the same as those of a pixel area corresponding to the object in the other one of the first image and the second image, wherein the generating of the difference image generates a difference image between the first image and the second image that are subjected to correction processing performed in the correcting.

19. The non-transitory computer-readable medium according to claim 17, wherein the determining determines, as the movement amount, a value obtained by averaging values of a top predetermined number of dimensions of the image area in a direction perpendicular to a thin line obtained as a result of thinning processing applied to the image area extracted in the extracting of the image area.

20. The non-transitory computer-readable medium according to claim 17, wherein the determining determines, as the movement direction of the object, an average of directions perpendicular to a thin line obtained as a result of thinning processing applied to the image area extracted in the extracting of the image area at a plurality of positions at which the top predetermined number of dimensions of the image area in the direction perpendicular to the thin line is obtained.

* * * * *